United States Patent [19]

Avny

[11] 4,427,230
[45] Jan. 24, 1984

[54] STAKE SYSTEM FOR FLATBED VEHICLES

[76] Inventor: Sam Avny, 44 Holmes Pl., Fredonia, N.Y. 14063

[21] Appl. No.: 310,477

[22] Filed: Oct. 13, 1981

[51] Int. Cl.³ .............................................. B60P 7/06
[52] U.S. Cl. ....................................... 296/43; 52/464; 105/380; 105/382
[58] Field of Search ..................... 296/36, 43; 105/380, 105/382, 386; 52/464

[56] References Cited

U.S. PATENT DOCUMENTS

| | | | |
|---|---|---|---|
| 2,838,338 | 6/1958 | Kerley | 296/43 |
| 3,764,177 | 10/1973 | Woodward | 296/43 |
| 3,841,695 | 10/1974 | Woodward | 296/43 |
| 3,871,702 | 3/1975 | Glassmeyer | 296/36 |
| 3,940,179 | 2/1976 | McBride | 296/43 |
| 4,042,275 | 8/1977 | Glassmeyer et al. | 296/43 |
| 4,067,601 | 1/1978 | Tuerk | 296/36 |
| 4,231,606 | 11/1980 | Tuerk | 105/380 |

*Primary Examiner*—Bruce H. Stoner, Jr.
*Assistant Examiner*—John A. Carroll
*Attorney, Agent, or Firm*—Christel, Bean & Linihan

[57] ABSTRACT

A stake system for flatbed vehicles wherein a single size stake body can be utilized with a suitably configured adapter secured to the lower portion thereof. The adapters are each sized to fit a particular stake pocket and enable the use of the single size stake body in conjunction with differently sized pockets. The stake bodies include slots for receiving sidewall-defining panels and they also include internally positioned retainers to receive and position a fastener element to facilitate the attachment of the adapter to the stake body. Additionally, a removable corner adapter permits the use of the same stake body cross section at each corner of the vehicle bed to receive and retain sidewall-defining panels at right angles to each other.

11 Claims, 10 Drawing Figures

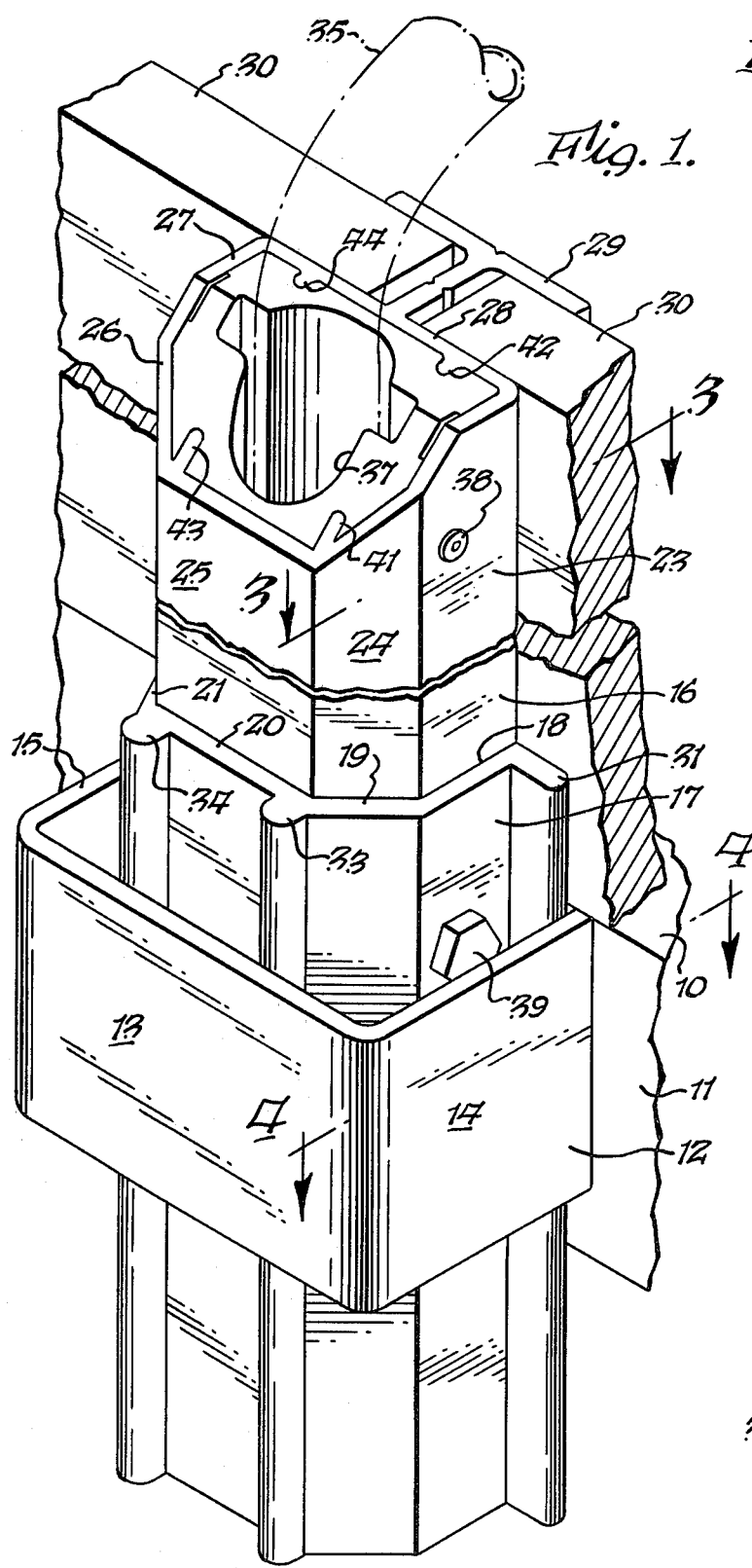

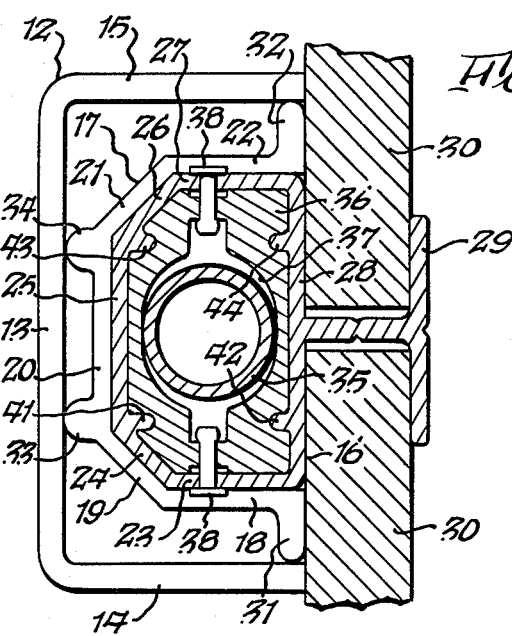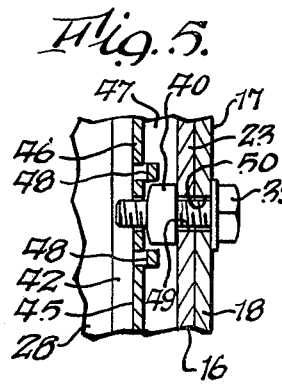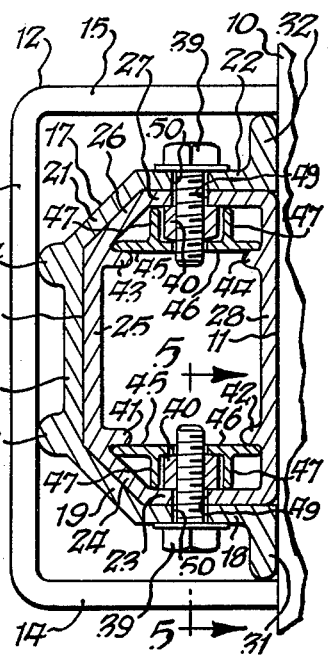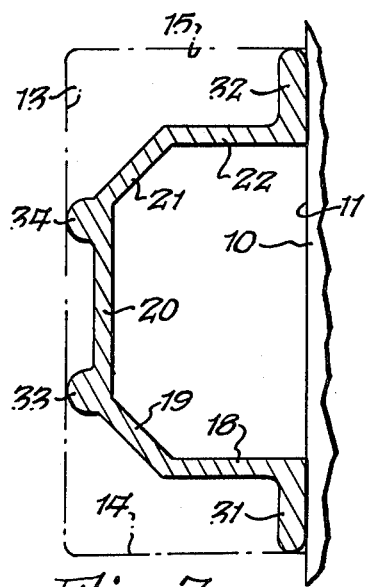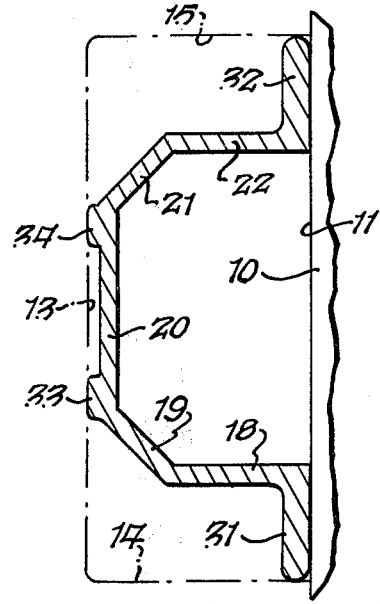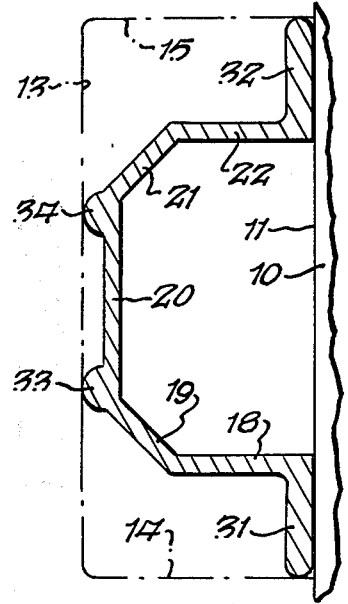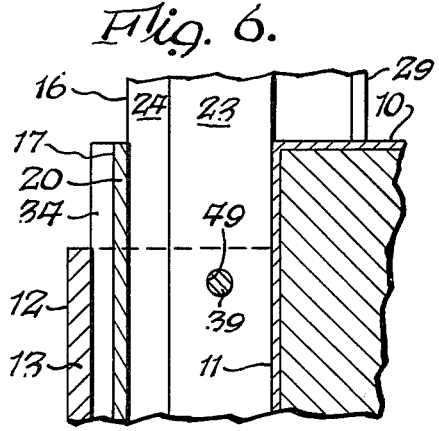

STAKE SYSTEM FOR FLATBED VEHICLES

BACKGROUND OF THE INVENTION

This invention relates to a stake system for supporting panels defining the sidewalls of a flatbed vehicle, and more particularly to a stake system wherein a universal stake is provided with adapters to permit its use in stake pockets of varying sizes and configurations.

Vehicles having open, unenclosed areas to accommodate loads of varying types and configurations are quite common. Examples of such vehicles are flatbed trucks and flatbed railroad cars. Frequently, such vehicles have a generally rectangular bed which includes a number of stake-receiving pockets positioned about the perimeter thereof. The stakes are elongated members positioned within the peripherally disposed stake pockets and are provided to restrain the load in the event it shifts, and to prevent it from falling off the bed. When relatively small articles are carried, and which could fit between adjacent stakes, panels are provided between the stakes to define sidewalls which serve to further contain the load being carried. The sidewalls can be of any particular height, ranging from several feet to about eight feet or so, depending upon the particular load involved. The panels are held in position by slots which are usually integral with and carried by the stakes, and into which the side ends of the panels fit.

If it is desired to cover such an otherwise open vehicle to protect the load from the elements, a tarpaulin can be provided over the open top of the vehicle and secured to tie-downs positioned along the sides of the bed. In order to prevent the tarpaulin from drooping into the open area, and possibly being damaged by the weight of rain or snow, bow members are typically provided along the length of the bed to support the tarpaulin. Such bow members often extend across the bed with their ends received in suitable openings provided at the top ends of the stakes, the openings being either integral with the stake or provided by cap structures which fit over the top ends of the stakes and include apertures to receive the ends of the bows.

In the past, stakes were often individually sized to fit a particular stake pocket, and because of the wide variation in pocket sizes a large number of individually sized stakes was required to fit the various pockets. As a result, a user who operated such flatbed vehicles made by different manufacturers was not in a position to interchange the stakes. Additionally, the distributor of such stakes had to maintain a large inventory of variously sized stakes in order to permit the replacement of those which were lost, misplaced, or damaged.

Although various types of stake pocket adapters have been devised (see, for example, U.S. Pat. Nos. 3,764,177 and 3,841,695), such previous adapters were intended to be usable in variously sized stake pockets and oftentimes relied upon spring-type elements to permit the adapter to snugly fit within a particular pocket. However, when such variable size devices were utilized, as adapters, the stake could be easily tilted from an upright position to a position which was inclined to the upright position, and therefore the entire stake assembly would be undesirably less rigid.

Another prior art stake adapter arrangement, one which completely surrounds the lowermost portion of the stake, is shown in U.S. Pat. No. 4,067,601. As there shown, the adapter either completely filled the space between the stake and the stake pocket, or the adapter is tapered in width and depth to permit it to be received in variously sized pockets. Unless the pocket itself is tapered to the same degree as the stake adapter, it is possible for the adapter to be held in the pocket, but in a less rigid fashion than if the adapter more closely fit the pocket, since the tapered adapter will make only line contact with a non-tapered pocket, the line contact taking place at the top of the pocket, which, again, permits undesirable inclination and movement of the stake from the upright position.

SUMMARY OF THE INVENTION

It is an object of the present invention to overcome the shortcomings of the prior art devices and to provide a stake assembly which includes a universal stake member to which may be secured adapters of different sizes to permit the universal stake to be utilized with variously sized stake pockets.

It is also an object of the present invention to provide a less expensive stake assembly by providing an adapter which is rigidly held in the stake pocket to support the stake firmly in an upright position, yet which does not completely fill the pocket, to thereby save material and also expense.

It is still a further object of the invention to provide a stake assembly system wherein removable stake adapters can be utilized to permit a particular stake to be used interchangeably in differently sized pockets.

It is another object of the present invention to provide a stake assembly system which is of rigid construction yet is relatively light in weight.

Briefly stated, in accordance with one aspect of the present invention, a stake assembly is provided for use in flatbed vehicles and is positionable in a substantially rectangular, stake-receiving pocket for supporting side-defining walls positioned between adjacent stakes. The stake assembly includes an elongated stake body portion of predetermined length which includes a pair of opposed, outwardly opening channels to slidably receive and to support sidewall defining panels. The body portion of the stake includes means for internally positioning and retaining a threaded member adjacent on one end thereof. Additionally, a sleeve is provided to overlie at least a portion of the end of the stake within which the positioning and retaining means are provided. The sleeve is adapted to fit within the stake-receiving pocket without completely filling the same and has its major outer dimensions conforming with the major dimensions of the pocket so that the sleeve is non-rotatably positioned therein. Means are provided for securing the sleeve to the stake body portion.

BRIEF DESCRIPTION OF THE DRAWINGS

FIG. 1 is a fragmentary perspective view of a stake assembly in accordance with the present invention. The assembly is shown positioned in a stake pocket and including the sidewall-defining panels in position, although the stake and panels are partially broken away to facilitate illustration and to show that stake length is variable, as is the height of the sidewall-defining panels.

FIG. 2 is an exploded perspective view, partially broken away to facilitate illustration, showing the several parts of a stake assembly according to the present invention.

FIG. 3 is a fragmentary cross-sectional view taken along the line 3—3 of FIG. 1 and shows a cross-section of a stake, a bow member, and associated sidewall-defining panels adjacent the upper end of the stake.

FIG. 4 is a fragmentary cross-sectional view taken along the line 4—4 of FIG. 1 at one point of interconnection between a stake and an adapter according to the present invention.

FIG. 5 is a fragmentary cross-sectional view taken along the line 5—5 of FIG. 4 and shows a longitudinal view of the stake-adapter securing means.

FIG. 6 is a fragmentary cross-sectional view taken through the central axis of the stake-adapter assembly at the stake pocket and also showing a portion of the stake structure resting upon the bed of a vehicle.

FIGS. 7, 8, and 9 are fragmentary cross-sectional views through various adapters which receive the same stake body portion, but each of which adapters is sized specifically to fit a particular stake pocket.

FIG. 10 is a fragmentary cross-sectional view through a corner stake and illustrates the positioning of a corner adapter which enables a given stake to be utilized in any of the corner pockets of the vehicle bed to support panels which are arranged at right angles to each other.

DESCRIPTION OF THE PREFERRED EMBODIMENTS

Referring now to the drawings, and particularly to FIG. 1 thereof, there is shown a fragmentary portion of a truck or railroad car bed 10 which provides a horizontal surface for supporting and carrying a given load. Bed 10 terminates in a vertical sidewall 11, which usually is formed from metal, and a plurality of generally rectangular pockets 12 is provided which extend outwardly from sidewall 11. Alternatively, however, pockets 12 can be positioned in bed 10 as to be within sidewall 11, if desired. Although a plurality of pockets is provided, the ensuing description will be of a single stake structure in a single pocket, and it will be understood that similar structural arrangements exist at the other pockets.

The outermost side 13 of pocket 12 is generally longer than the inwardly extending sides 14, 15, and is usually parallel to bed sidewall 11, and spaced therefrom to define the width dimension for the pocket. The length dimension of the pocket is defined by the spacing between sides 14 and 15. It will be appreciated that the normal vehicle bed is of generally rectangular configuration when viewed in plan, and it incorporates a plurality of such pockets spaced at predetermined intervals about the periphery of the bed, with preferably one such pocket at each corner of the bed.

Positioned within pocket 12 is a stake assembly according to the present invention and which includes a stake body portion 16 of predetermined length and cross section, and an adapter 17 which fits over a portion of the lower end of stake body 16, the stake body having any particular cross section desired and having cross-sectional dimensions less than the corresponding dimensions of the pocket. Adapter 17 includes walls 18, 19, 20, 21, 22 which overlie and preferably are in contact with corresponding walls 23, 24, 25, 26, 27 of stake body 16. Although stake body 16 is shown as having a combined trapezoidal-rectangular cross section, that particular cross section is not essential to the present invention, and any convenient or desired cross section could be utilized so long as it provides the requisite rigidity for the particular application.

Stake body 16 includes wall 28 which is directed inwardly of the vehicle and from which extends a T-shaped, longitudinally oriented member 29, which serves to define a pair of opposed, U-shaped channels each of which is adapted to receive panel 30 which defines a portion of the sidewall of the load-carrying part of the vehicle. Panel 30 can be formed from any desired materials, although plywood is the material most commonly employed. As shown most clearly in FIGS. 2 and 6 T member 29 extends from the uppermost portion of stake body 16 to a point spaced from the lowermost portion thereof, the spacing being dependent upon the length of the stake intended to extend within and through pocket 12. As shown and described herein, T member 29 is integral with stake body 16, which is preferably an extruded aluminum alloy cross section. However, although an extruded cross section is preferred, a separate element such as an I channel, could be employed, if desired, to provide the opposed, U-shaped channels, the separate element being suitably secured to the stake body.

Adapter 17 is shown most clearly in FIG. 2. As there shown, it has major transverse length and width dimensions which conform with those of pocket 12. However, also as shown, adapter 17 does not completely fill pocket 12 and thereby utilizes less material than an adapter which does. However, in order for adapter 17 to be non-rotatably positioned in pocket 12, at least two points of contact must be assured at two of the opposed walls defining pocket 12. In the configuration shown, the two opposed, outwardly extending flanges 31, 32 of adapter 17 are in contact with sidewall 11 of the bed, and the two outwardly extending projections 33, 34 are in longitudinal line contact with side 13 of pocket 12. By providing at least two-point contact at each of one pair of opposed walls, rotation of the adapter within pocket 12 is prevented. Outwardly extending flanges 31, 32 also are in longitudinal line contact with opposed sidewalls 14 and 15 to limit sidewise movement of adapter 17. Thus it can be seen that adapter 17 can be so configured to receive a single stake body portion and have its outwardly projecting flanges 31, 32 and outwardly extending projections 33, 34 so sized to fit a particular pocket size, as is more clearly shown in FIGS. 7, 8, and 9, wherein innermost faces 18, 19, 20, 21, and 22 of adapter 17 are the same size and configuration in each Figure while the outer portions of adapter 17 can be of differing sizes and shapes to permit each adapter to be snugly received in its respective pockets.

As shown in phantom in FIG. 1, a tubular bow 35 extends into the uppermost portion of stake body 16 and the opposite end of bow 35 extends into the upper portion of the corresponding stake (not shown) on the opposite side of bed 10. An insert 36 is provided which fits within the upper portion of stake body 16 and defines a bow-receiving socket 37 therein. As shown, insert 36 is a single element, although, if desired, it can be provided in the form of two opposed elements, and preferably is secured to the uppermost portion of stake body 16 by means of a fastener 38 such as, for example, a rivet as is shown in FIG. 3. The longitudinal extent of such an insert can be of the order of two inches or more to support a sufficient length of bow 35 and thereby prevent excessive rocking of bow 35 within insert 36. Although it is possible to form the interior of stake body 16 in such a fashion as to provide an integral bow-receiving aperture (not shown), the use of an insert is preferred since it involves less material than if a uniform cross section including an integral, longitudinal, bow-receiving aperture were provided throughout the length of stake body 16. Additionally, although bow 35 is shown and described as being a hollow member, it can be, if desired, solid, although hollow bows are preferred because of their lower weight.

As shown in FIG. 2, stake body 16 and adapter 17 are connected by means of screws 39 which pass through sidewalls 18 and 22 of the adapter and through sidewalls 23 and 27, respectively, of stake body 16 to nuts 40 (see FIGS. 4 and 5) which are retained within the interior of body 16. Since the interior of stake body 16 is preferably hollow to minimize the amount of material needed, and consequently also to minimize the expense thereof, opposed, inwardly projecting ridges 41, 42, 43, 44 are provided to define the edges of internal parallel planes which are adapted to slidably receive a retaining member 45 (see also FIG. 4). Retaining member 45 includes a flat base 46 which includes two upwardly extending, spaced, parallel longitudinal ridges 47, the spacing of which is such as to non-rotatably receive nuts 40. Formed in base 46 and extending into the space between ridges 47 are two pairs of depressions 48 which are spaced to accommodate a pair of opposed surfaces of nuts 40 and serve to position nuts 40 longitudinally at the same spacing as apertures 49 in stake body 16 and apertures 50 in adapter 17. Preferably, each retaining member 45 positions and carries two nuts 40 for securing one side of adapter 17 to stake body 16, although, if desired, a retainer can be provided to accommodate only a single nut. Although two such retainers 45 are shown in FIGS. 2 and 4, and the use of two is preferred from the standpoint of improved rigidity, only one such retainer can be utilized to facilitate securing the adapter to the stake body. Additionally, retainers 45 can also be used to secure to a stake other elements, such as tiedown devices and the like, and they can be positioned at any desired longitudinal position along the stake body.

In assembling adapter 17 to stake body 16, the stake body is positioned on one side, and retaining member 45, preferably having two nuts 40 positioned thereon is inserted into the lower end of the stake and positioned on and moved along the uppermost pair of projections 41, 42 to the point where the axes of nuts 40 coincide with the axes of apertures 49 in stake body 16. At that point, adapter 17 is positioned over stake body 16 so that corresponding apertures 50 in adapter 17 are aligned with apertures 49 in stake body 16, and screws 39 are inserted, engaged with respective nuts 40, and tightened to provide a secure connection. The operation is then repeated by turning stake body 16 over onto its opposite side and securing the other side of adapter 17 to the stake body in the same manner. In a preferred embodiment, adapter 17 and retainers 45 are made from extruded aluminum alloy for high strength and low weight. Although any of a number of metals or other materials could be utilized to form the stake bodies, the adapters, and the retainers, it has been found that aluminum alloys bearing the designations 6005-T5 and 6061-T6 and having the temper indicated are suitable materials which are extrudable and which exhibit the desired strength and rigidity.

Although it is possible to provide threads in the stake body and secure the adapter thereto without the use of nuts, if the body is aluminum, it is possible that with rough handling, or excessive torque upon the screws utilized to attach the adapter to the stake, the threads could become stripped, thereby destroying the connection therebetween. Consequently, it is preferred that steel screws and steel nuts be provided, and the use of the retainer disclosed facilitates the proper positioning of those nuts within the interior of the stake body. It should be noted that when steel screws and nuts are used they should either be cadmium or zinc plated or they should be stainless steel, in order to avoid corrosion of the aluminum at the points of contact with the steel.

In those instances where a stake is positioned at a corner of the bed of the vehicle, the two panels supported by the stake are at right angles to each other rather than being coplanar as shown in FIGS. 1 and 3. Consequently, in order to permit the right angle orientation of the panels, a special stake having panel-receiving, U-shaped openings which are arranged at right angles to each other can be provided for each pair of corners. In order to minimize the inventory of stakes which are required, a corner adapter 51 can be provided as shown in the uppermost portion of FIG. 10, and which includes a generally U-shaped portion 52 wherein the legs 53, 54 of the U are of unequal length. Leg 53 is of a longer length than leg 54 and is positioned against inwardly facing wall 28 of stake body 16. Leg 53 includes an outwardly directed positioning flange 55 which rests against wall 27 of stake body 16. Shorter leg 54 includes an outwardly and downwardly extending flange 56 which fits over the outer edge of T-shaped member 29 to properly position corner adapter 51. Extending from leg 53 and parallel to the base of U-shaped portion 52 to a point opposite outwardly and downwardly extending flange 56 is an elongated flange 57 which together with outwardly and downwardly extending flange 56 defines a panel-receiving opening to receive panel 30. As is apparent from FIG. 10, the addition of corner adapter 51 to stake body 16 in the manner described permits sidewall-defining panels to be positioned at right angles to each other. Preferably, corner adapter 51 is secured to stake body 16 as by means of bolts 58 and nuts 59. If the stake is to be provided at an adjacent corner of the vehicle, corner adapter 51 will, of necessity, have to be inserted and secured in the opposite end of T-shaped member 27 as shown in phantom in the lowermost portion of FIG. 10. Although the use of corner adapter 51 has been described in terms of its use at the corner of the vehicle, it could also be utilized with a stake positioned at some intermediately positioned pocket in order to facilitate the provision of an intermediate panel at a point other than at an end of the vehicle.

In operation, stake body portions 16 are secured to the proper size stake adapter 17, as previously described, in order to properly fit the pocket of the particular vehicle involved. The stakes are then so positioned that adapter 17 fits securely into pocket 12 and so that the lowermost portion of T-shaped member 29 rests against the upper portion of bed 10, as shown in FIG. 6. If the vehicle is to be fully enclosed, stakes utilizing corner adapters 51 can be provided as hereinabove described and positioned at the respective corners of bed 10. Thereafter, sidewall-defining panels 30 are positioned above and between adjacent stakes and are then inserted into the slots defined by T-shaped members 29 and are permitted to slide vertically until they rest on bed 10 as shown in FIG. 1. Loading or unloading of the vehicle can be accomplished by removing one or more panels, or stakes as required to accommodate the particular load to be carried. If desired, bow members 35 can be provided along the length of the vehicle between opposed stakes to support a protective tarpaulin in order to cover the load and protect it from the elements.

As is apparent from the foregoing, the present invention provides an improved stake assembly for flatbed vehicles. The assembly that is disclosed and described herein provides greater versatility than previous such systems and does so with greater rigidity and also at a lower cost.

While particular embodiments of the present invention have been shown and described, it will be apparent to those skilled in the art that various changes and modifications be made without departing from the spirit of the present invention, and it is intended to cover in the appended claims all such changes and modifications that fall within the scope of the present invention.

What is claimed is:

1. A stake assembly for use with flatbed vehicles of the type provided with structure forming the sidewalls of stake-receiving pockets of generally rectangular cross-section, each stake assembly capable of being non-rotatably mounted within an associated stake-receiving pocket, said stake assemblies when so mounted being capable of supporting sidewall-defining panels between adjacent stake assemblies; each stake assembly comprising:
    (a) an elongated stake body of predetermined length, said stake body including means for positioning and retaining an edge of at least one panel member adapted to be retained by adjacent stakes;
    (b) a sleeve adapted to overlie and to be in contact with a portion of the periphery of said stake at one end thereof without completely encircling the same, said sleeve defined by a thin wall section of predetermined length less than the length of said stake, said wall section having an inner surface and an outer surface, said inner surface substantially conforming in shape and dimensions to the shape and dimensions of a portion of the exterior stake body so that said sleeve closely contacts said stake when it is placed thereagainst, said outer surface of said sleeve having a plurality of spaced apart rigid outwardly vertically extending projections capable of contacting the sidewalls of said stake-receiving pocket when said sleeve is placed therein; and
    (c) means for securing said sleeve to said stake body at said one end thereof.

2. The stake assembly of claim 1 wherein the means for positioning and retaining an edge of a panel member comprises longitudinal channel means extending outwardly from said stake body, and positioned on a side of said stake body which faces inwardly of said vehicle and extends from a point spaced from said end of said stake body to which said sleeve is secured to the other end thereof.

3. The stake assembly of claim 1 wherein said stake body is hollow and includes a bow retainer positioned at the end opposite the end to which the sleeve is secured, said bow retainer being a unitary element which is secured to said stake body.

4. The stake assembly of claim 3 wherein said bow retainer comprises two inserts, each of which is secured to the stake body and which together define a bow-receiving aperture therein.

5. The stake assembly of claim 1 wherein said sleeve includes a pair of oppositely disposed, outwardly extending flanges, the outer surfaces of which are adapted to contact the opposed sidewalls of said stake-receiving pocket when said stake assembly is inserted therein.

6. The stake assembly of claim 5 wherein said sleeve includes at least one longitudinal outwardly extending projection, said projection extending in a direction generally perpendicular to said outwardly extending flanges and adapted to be in contact with another of said stake-receiving pocket when said stake assembly is inserted therein.

7. The stake assembly of claim 1 wherein said stake body includes at least one pair of internal, axially directed projections defining a plane which extends inwardly from one end thereof, and a retaining member slidable along said plane, said retaining member including means to retain at least one threaded member.

8. The stake assembly of claim 7 wherein said stake body includes two pairs of opposed, inwardly projecting ridges to define two spaced, interior planes and a pair of retaining members slidable within said grooves, said retaining members including means to retain at least one threaded member.

9. In a stake assembly wherein a sleeve is provided to permit the use of stake bodies of a common cross section with vehicles provided with variously sized stake-receiving pockets; said sleeve comprising a member defined by a thin wall section of predetermined length less than the length of a stake body, said wall section having an inner surface and an outer surface, said inner surface substantially conforming in shape and dimensions to the shape and dimensions of a portion of the exterior of the stake body so that said sleeve closely contacts said stake body when it is placed thereagainst, said outer surface of said sleeve having a plurality of spaced apart rigid outwardly vertically extending projections adapted to non-rotatably contact the sidewalls of said stake-receiving pocket when said sleeve is placed therein.

10. In a stake construction for use with a flatbed vehicle and incorporating a stake body having a pair of opposed channel members defining panel-receiving openings extending in opposite directions to permit adjacent panels to be positioned in substantially coplanar relationship, the improvement comprising a generally U-shaped corner adapter for placement within one of said opposed channel members, said corner adapter including a panel-receiving opening extending substantially perpendicularly to said channel members, whereby to permit said stake body to receive and support a pair of perpendicularly disposed panels.

11. The stake construction of claim 10 wherein said corner adapter includes means for limiting the extent to which said adapter extends within said channel.

* * * * *